United States Patent
Wirz

(10) Patent No.: US 6,386,953 B1
(45) Date of Patent: May 14, 2002

(54) TOPOLOGICAL PROFILING OF GRINDING WORMS FOR CONTINUOUS GENERATING GRINDING OF GEAR TEETH

(75) Inventor: Walter Wirz, Pfäffikon (CH)

(73) Assignee: Reishauer AG, Wallissellen (CH)

(*) Notice: Subject to any disclaimer, the term of this patent is extended or adjusted under 35 U.S.C. 154(b) by 0 days.

(21) Appl. No.: 09/506,395

(22) Filed: Feb. 18, 2000

(30) Foreign Application Priority Data

Feb. 20, 1999 (DE) .......................................... 199 07 363

(51) Int. Cl.[7] .................................................. B24B 1/00
(52) U.S. Cl. .......................................... 451/47; 451/147
(58) Field of Search .............................. 451/47, 48, 114, 451/147, 275, 56, 900

(56) References Cited

U.S. PATENT DOCUMENTS

| | | | |
|---|---|---|---|
| 4,400,916 A | * 8/1983 | Bloch et al. | 51/287 |
| 4,993,194 A | * 2/1991 | Cadisch | 51/206 R |
| 5,954,568 A | * 9/1999 | Wirz | 451/47 |
| 6,012,972 A | * 1/2000 | Jankowski | 451/48 |
| 6,077,150 A | * 6/2000 | Jankowski | 451/47 |

* cited by examiner

Primary Examiner—Timothy V. Eley
Assistant Examiner—Dung Van Nguyen
(74) Attorney, Agent, or Firm—Sughrue Mion, PLLC

(57) ABSTRACT

A profiling tool (4) is used for profiling or dressing the grinding worm thread, wherein said tool has a simple basic geometric shape, for example in the shape of a rod. The profiling tool (4) has on its active, abrasive surface (6, 7, 8) a transformed topology as needed for the grinding worm (1). The tool passes the grinding worm profile (2) during the profiling process in such a manner that points on the active profiling tool surface are matched in advance and brought into contact with corresponding points on the grinding worm flanks. Thereby topologically modified grinding worms may be essentially profiled faster than in traditional methods.

9 Claims, 4 Drawing Sheets

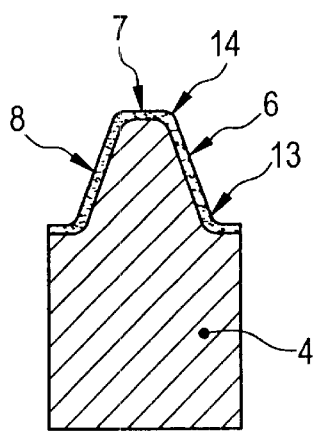
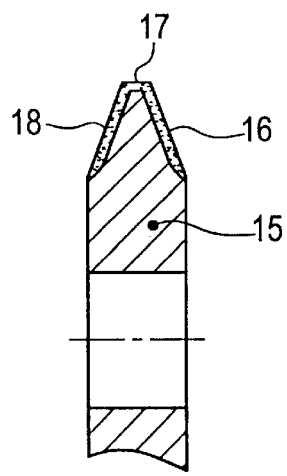
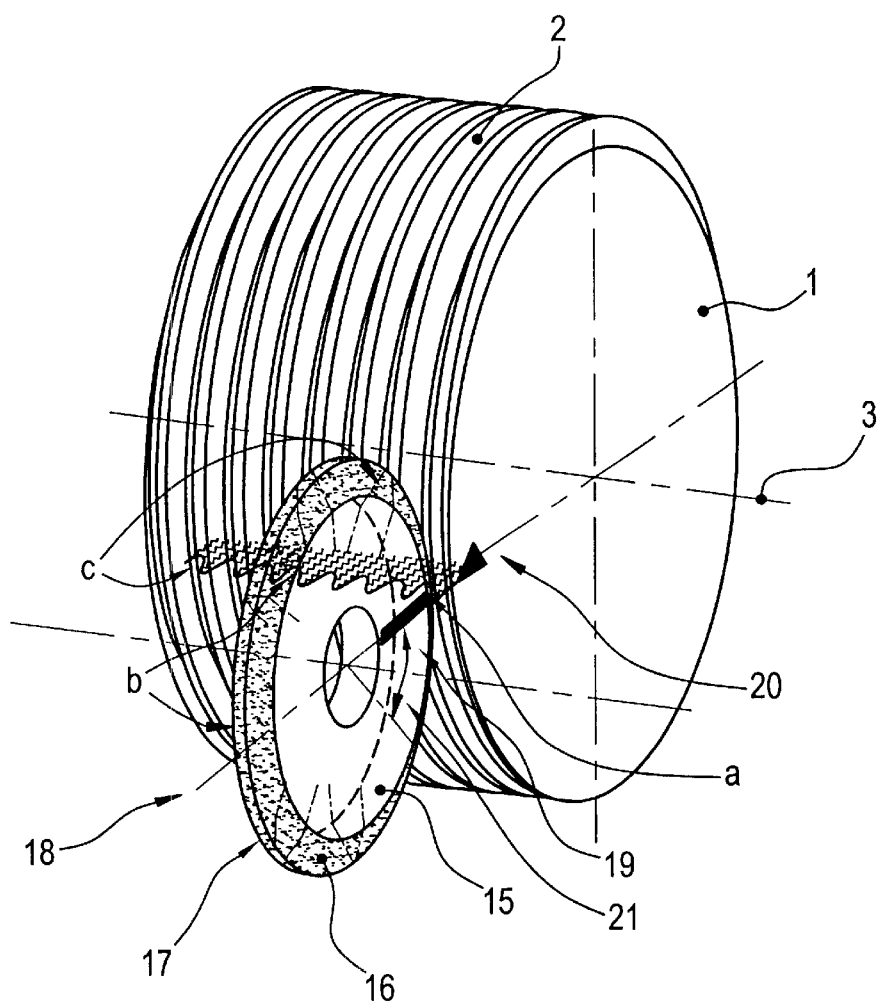

TOPOLOGICAL PROFILING OF GRINDING WORMS FOR CONTINUOUS GENERATING GRINDING OF GEAR TEETH

BACKGROUND OF THE INVENTION

The invention relates to a process and a device for rapid profiling of topologically corrected grinding worms as they are used for continuous generating grinding of gear teeth.

Topologically corrected gear teeth on highly loaded gear wheels are increasingly used in transmission gears that have to run at an especially low noise level. Wheels corrected in such a manner are needed in increasing numbers, particularly in motor vehicles but also in the aircraft industry.

Corrected tooth flanks may be manufactured most efficiently and with high precision in the continuous generating grinding process by continuous shifting of the grinding tool during the work process. There is a problem, however, in that the manufacturing of the necessary tools, specifically the grinding worm profile, take possibly a lot of time. This is caused because in general technology this grinding worm profile can be manufactured only with a tool that comes into contact with the worm flanks only at a single point.

The topological generating grinding process with continuous shifting is based on the fact that during grinding of the gear work piece there is for each point of the tooth flank surface a precisely predetermined individual matching point on the grinding worm profile whereby this matching point on the flank is ground during the grinding process and thereby shaped to the required specification. In other words, the desired geometric shape of the topologically corrected tooth flank surface is included in transformed manner on the grinding worm flank surfaces and appears again in a transformed manner during the grinding process on the tooth flank because of the relative motion between the grinding worm and the work piece. During profiling of the grinding worm there is therefore the challenge to create the required tooth flank topology on the worm flank in a transformed manner.

Computer programs have been developed to determine this transformed topology, which requires the geometric shape of the specific tooth flanks as entry data, for example in form of a table that contains deviation values of the theoretically exact tooth flank area in relation to specifically defined points on the tooth flank surface. As a result, these programs provide again a table that specifies the coordinates of points of the specific geometry of the worm flanks. These calculating programs additionally require different processing data like the ratio of grinding path to shifting path or the amount of modification caused by the infeed of the tool etc. After creation of such a table with specific data of the worm flank geometry, the production of a grinding worm may be principally compared with the production of any kind of free-formed surfaces, as for example die blocks for forging sheet metal for automobiles. In both cases, corrections to specified shapes are only possible with the use of tools that machine with point contact. In case of die blocks there is a die-sinking cutter necessary; in case of worm shaping there is necessary a correspondingly designed rotating diamond cutter. Whereas there are normally at least three linear N/C axes necessary in case of a die-sinking cutter, there are usually two linear axes in the topological profiling of grinding worms for the movement of the rotational diamond cutter an one rotating N/C axis for the turning motion of the grinding worm.

SUMMARY OF THE INVENTION

As mentioned above, the processing of a free-form surface or the profiling of topological grinding worm flanks take a very long time since the entire surface must be covered with a tool line by line to bring each individual point to its final specification.

It is the object of the present invention to show a procedure and a device, as well as a profiling tool, with which the topological profiling of grinding worms is performed more rapidly. This object is achieved by the combination of characteristics in the claims.

The basic idea is—within a certain limits—that the reproduction and transfer of a free-form surface to another in a transformed manner is possible and also in reverse. Should therefore a work piece have teeth that have the desired topology and should the grinding worm flanks be profiled with said teeth then reproduction in the reverse direction as above would occur during a process, which could be the same as the grinding process. The grinding worm would thereby be profiled in a very short time. Also an initial gear with a very large face width, which would have to have the specified topology in a correspondingly stretched manner, would be suitable for fast profiling at appropriate ratio of grinding stroke and shifting path.

Should there be therefore a working face, which makes possible a definable arrangement of matching points on the to-be-manufactured surface during reproduction and should this working face be produced in its transformed shape and be covered with a suitable abrasive surface coating, for example with fine diamond grit, then the production of a topological surface is thereby made possible in a very short time span. Working faces are preferably used that have a simple geometric basic shape and which may be manufactured in a simple way. For example, the above-mentioned toothed wheel, which would be principally well suited for profiling, is difficult to be manufactured with high precision. In contrast, items with essentially flat surfaces or profile discs would be much more suitable.

In the simplest version of the invention, a straight rod is used for the profiling shaping of a topological grinding worm profile. The rod has a cross section that matches the worm groove, which has an abrasive surface that is, for example, coated with hard-material grains. This rod is placed for profiling against the worm groove in such a manner that one part of its cross section comes into full contact with the groove. Should the rod now be brought into contact further with the worm profile itself so that each longitudinal position of the rod matches a certain place on the worm path, then the above-mentioned requirement is fulfilled and the transformed shape of the rod surface may be transferred onto the worm flank.

During the rotation of the grinding worm there is not only necessary the movement of the rod in axial direction of the grinding worm (depending on the worm pitch) but at the same time a longitudinal shifting of the rod is necessary in the direction of the rod axis in order to always keep a new cross section in contact with the worm flank.

BRIEF DESCRIPTION OF THE DRAWINGS

Two versions of the invention are described below and accompanied by drawings:

FIG. 2 shows a cross section of the profiling rod of the first version.

FIG. 3 and FIG. 4 show illustrations of a second version, respectively.

DETAILED DESCRIPTION OF THE PREFERRED EMBODIMENTS

Figure 1:
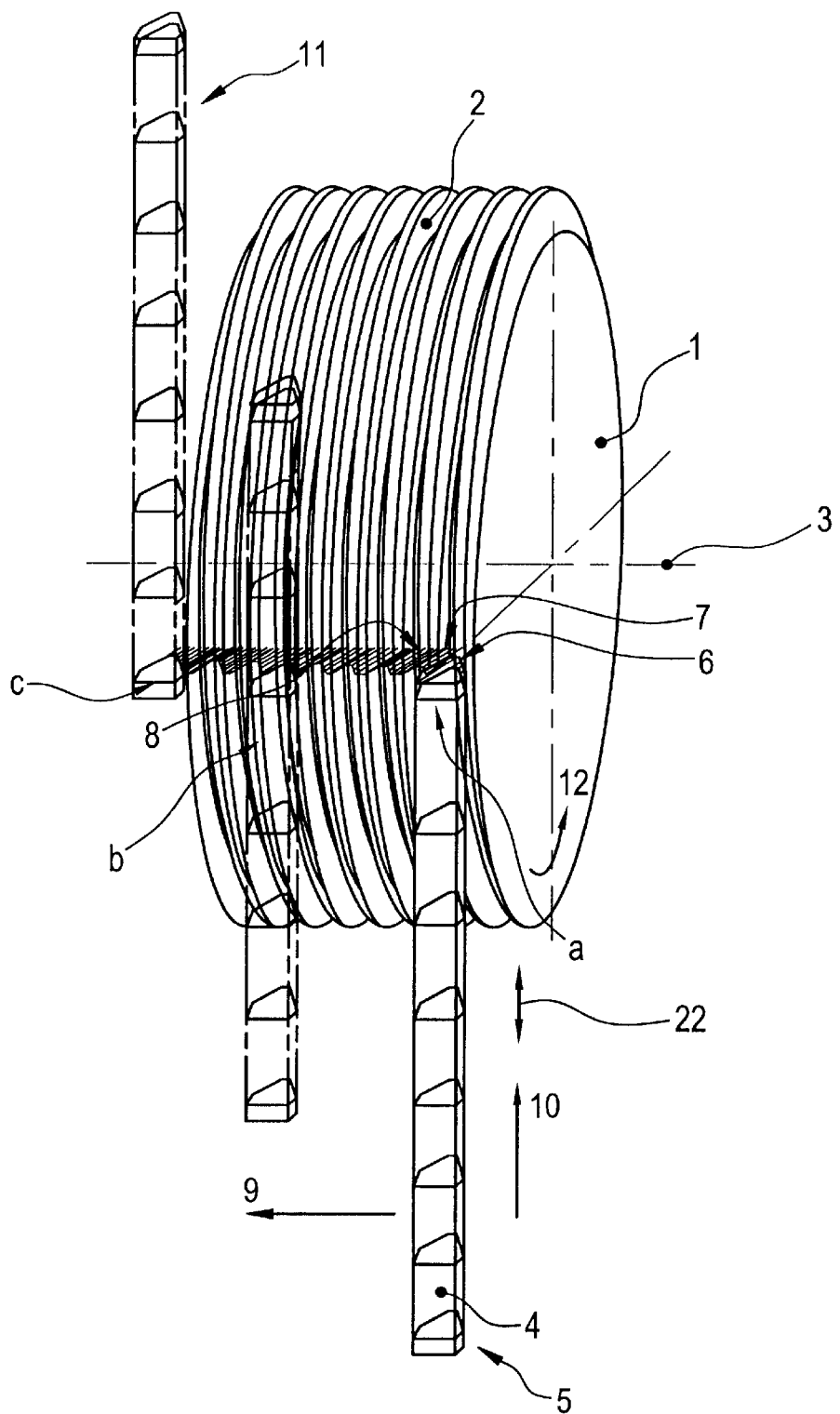
FIG. 1 shows the first version.

The grinding worm 1 according to FIG. 1, which surface 2 is to be profiled, rotates around its axis 3. The profiling rod 4 is located at the beginning at position 5. Its active surfaces 6, 7 and 8 are coated with hard-material grains and have full line contact with the groove of the grinding worm 1. The rod 4 is moved in the direction 9 during the shaping process, which means in the direction of the worm axis 3, depending on the worm pitch, and at the same time in the direction of the rod axis 10. The rod 4 is in position 11 at the end of the process. If the movements 9 and 10 are performed in a synchronized manner at a particular ratio to the turning angle 12 of the grinding worm, then an exact match has been established between all points on the shaping rod surface and points on the worm flank surface. Thereby the entire worm flank topology in its matching transformed way must be included on the shaping rod surface 6, 7 and 8.

In case of highly stressed toothed wheels there is often the requirement, besides of having the specified tooth flank topology, that the root fillet is also ground to create essential transitional points at the tooth root for stability reasons. Tip relief or rounded sections on the tooth tip are also to be ground in the same process in certain cases. All these additional surfaces may be processed in one and the same work step together with the tooth flank processing if the grinding worm profile is profiled accordingly. This means that the profiling tool for these sections must also have the matching transformed shape.

FIG. 2 shows a rod-like profiling tool in a cross-sectional view for this purpose.

FIG. 2 is described as follows: 4 is the profiling rod, as also shown in FIG. 1, with the active surfaces 6, 7 and 8 for profiling of the flank surfaces and the groove bottom; 13 is the section for profiling zones with which the root fillets are ground; and 14 is the section for profiling zones with which the tip areas of teeth are ground.

Figure 6A:
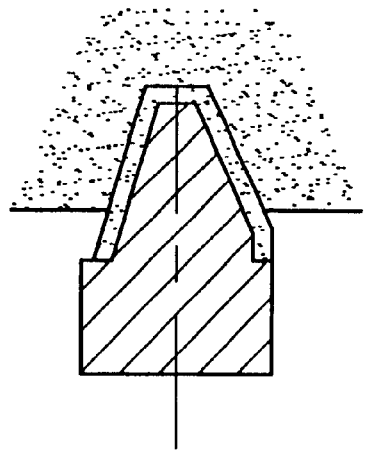
FIGS. 6a–6c show respective cross sections of the profiling tool along the length of the profiling tool.
Figure 6B:
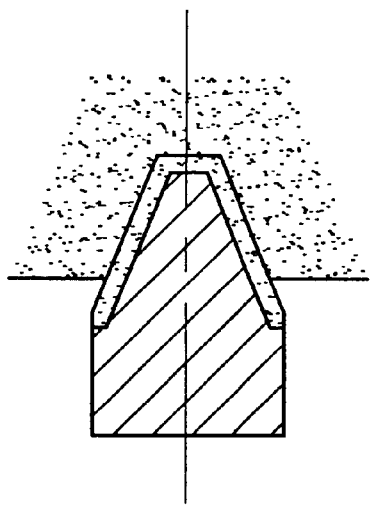
Figure 6C:
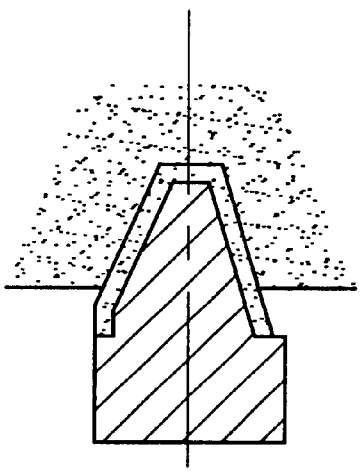

The profiling rod 4 shown in FIG. 1 may have a cross section that varies in size along the length of the profiling rod 4. For example, a first portion "a" of the rod 4 may have a first cross section as-shown in FIG. 6a. A second portion "b" of the rod 4 may have a second cross section as shown in FIG. 6b. And a third portion "c" of the rod 4 may have a third cross section as shown in FIG. 6c.

FIG. 3 and FIG. 4 show another version of the profiling tool.

Here the profiling tool is in the shape of a disk, which has on its circumference the active surfaces 16, 17 and 18 (see FIG. 4). At the beginning of the profiling process, the tool is positioned around its axis in such a manner that it is located at the beginning of the worm path 20 and that its outer edge is positioned totally inside the worm groove. During the actual profiling process, the grinding worm and the profiling tool each rotate at a certain ratio whereby the profiling tool also moves at the same time, depending on the worm pitch, in the direction of the worm axis. The rotating ratio is predetermined and causes the proper correction of the topology contained on the tool during transfer onto the worm flanks. For example, the rotating angle ratio could be so that during one rotation of the grinding worm, the profiling tool is turned in an angle 21 whereby it completes a full rotation after traveling the entire grinding worm width. This rotating angle ratio does not have to remain constant. It is rather an advantage if it is variable as a function of the topology to be produced, for example at sections with great variabilities in the worm profile, a rapid rotation of the profiling tool is probably beneficial; however, where small or no profile variabilities are present then a small angle of rotation or even a standstill may be appropriate. However, the rotating angle ratio still determines the correction of the topology that is found on the profiling tool circumference.

Similar to the profiling rod 4 in FIG. 1, the profiling disk 15 in FIG. 3 may have a cross section that varies in size along the circumferential length of the profiling disk 15. For example, a first portion "a" of the disk 15 may have a first cross section as shown in FIG. 6a. A second portion "b" of the disk 15 may have a second cross section as shown in FIG. 6b. And a third portion "c" of the disk 15 may have a third cross section as shown in FIG. 6c.

An additional oscillating movement may be added to the main movement of the profiling tool in the direction of the grinding worm path to obtain a higher average relative speed between the profiling tool and the to-be-dressed grinding worm flank, which is indicated in FIG. 1 with the reference number 22. Depending on amplitude and frequency, selected matching points are no longer brought into contact with one another but more or less larger surface areas make contact. Because of the general very small deviations between the topological surface and its basic geometry, this method may be mostly used without any noticeable loss of accuracy.

Other types of profiling tools are also conceivable as, for example, a segment of a circle with active surfaces on the inside or the outside or, for example, a tool in the shape of a cup or a spiral whereby the outer edge has active surfaces. There could also be two separate tools: one for each grinding worm flank. This opens additional possibilities to influence the surface profile if these two tools are adjusted independently during the profiling process in their position and their angle.

Figure 5:
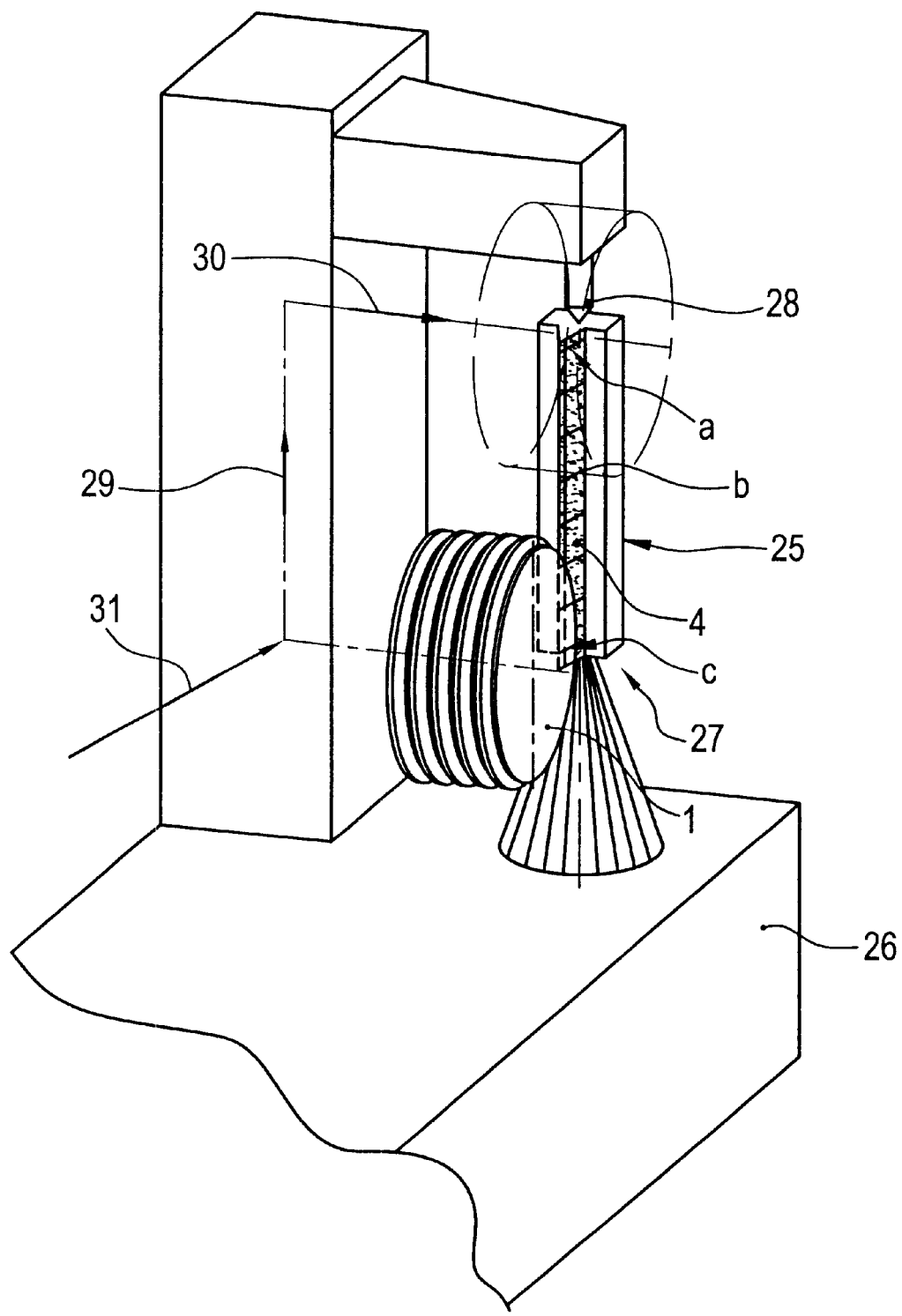
FIG. 5 shows a profiling device.

As shown in FIG. 5, the profiling process is especially simple when using the first-mentioned profiling rod 4. In addition, this tool could be rigidly mounted to a gear grinding machine 26, instead of a work piece, by means of an adapter 25 between points 27 and 28. The grinding worm must be moved with corresponding rotation and with the help of a machine axis 29 (grinding stroke) and 30 (shift path) along the profiling rod in a manner whereby the proper match of corresponding flank points on the grinding worm 1 and profiling rod 4 is ensured. The infeed amount for profiling the tool 1 is carried out by the infeed movement 31.

This method requires no special mechanical devices for profiling of the grinding worm, other than the necessary programming of the N/C controlling means, which allows a very simple machine design.

What is claimed is:

1. A process for profiling topologically corrected grinding worms for continuous generating grinding of gear teeth, comprising the steps of:

providing a profiling tool (4, 15) that has a geometric shape with an active surface (6, 7, 8; 16, 17, 18) having a transformed topology as needed for the grinding worm (1), wherein a cross section of the active surface varies in size along a length of the profiling tool; and passing the profiling tool across a grinding worm profile (2) in such a manner that points on the active surface come into contact with pre-selected matching points on grinding worm flanks.

2. A process according to claim 1, further comprising the step of:

oscillating the profiling tool with adjustable amplitude and frequency superimposed on a main movement of the profiling tool (4, 15) relative to the grinding worm (1) in a direction of a worm path (2).

3. A process according to claim 1, wherein the passing step involves turning the profiling tool through only one full rotation to complete the profiling of the grinding worm.

4. A profiling tool for profiling topologically corrected grinding worms for continuous generating grinding of gear teeth, said profiling tool comprising:

a basic body (4, 15) with an active surface (6, 7, 8; 16, 17, 18) along a length of said profiling tool, said active surface being coated with hard-material grains, wherein a cross-section of said active surface (6, 7, 8; 16, 17, 18) varies in size along said length, and has a transformed topology as needed for the grinding worm, such that points on said active surface are matched in advance and are contactable with corresponding points on the grinding worm.

5. A profiling tool according to claim 4, wherein said basic body has a rod shape.

6. A profiling tool according to claim 5, wherein said basic body is fastened to an adapter (25), which is mountable onto a workpiece spindle of a gearwheel grinding machine.

7. A profiling tool according to claim 4, wherein said basic body has the shape of a disk and wherein said active surface (16, 17, 18) covers at the most 360° of a circumference of said basic body.

8. A profiling tool according to claim 4, wherein said active surface includes first zones (6, 8; 16, 18) for profiling of flank surfaces of the grinding worm profile and second zones (7, 13, 14, 17) for profiling of crest surfaces and groove surfaces of the grinding worm profile.

9. A device for profiling topologically corrected grinding worms for continuous generating grinding of gear teeth, comprising:

a grinding spindle for mounting a grinding worm (1);

a device (27, 28) on which a profiling tool (4, 15) is mounted, said profiling tool having an active surface along a length thereof, wherein a cross section of said active surface varies in size along said length and has a transformed topology as needed for the grinding worm; and means (29, 30) for moving, relative to the grinding worm (1), said profiling tool (4, 15) during the profiling process of the grinding worm (1) in such a manner that points on said active surface (6, 7, 8; 16, 17, 18) are matched in advance and brought into contact with corresponding points on the grinding worm flanks.

\* \* \* \* \*